United States Patent [19]

Tsuji

[11] 3,906,371

[45] Sept. 16, 1975

[54] REPLACEMENT RADIO RECEIVER APPARATUS FOR AUTOMOTIVE INSTALLATIONS INCLUDING ADJUSTABLY POSITIONABLE CONTROL ELEMENTS AND CHASSIS CASE

[75] Inventor: Tom T. Tsuji, Monterey Park, Calif.

[73] Assignee: J.I.L. Corporation of America, Inc., Carson, Calif.

[22] Filed: Jan. 25, 1974

[21] Appl. No.: 436,508

[52] U.S. Cl. ................ 325/352; 317/101 R; 334/85

[51] Int. Cl. ............................................ H04b 1/08

[58] Field of Search .................... 325/352, 353, 360; 317/101 R, 101 CB, 120; 174/57; 334/7, 85, 86; 248/27

[56] References Cited

UNITED STATES PATENTS

| | | | |
|---|---|---|---|
| 2,963,826 | 12/1960 | Snider | 174/57 |
| 3,390,338 | 6/1968 | Race | 325/352 |
| 3,783,321 | 1/1974 | Patterson | 317/101 R |

*Primary Examiner*—Gerald P. Tolin
*Attorney, Agent, or Firm*—Fraser and Bogucki

[57] ABSTRACT

Replacement radio receiver apparatus for "aftermarket," in-dash installation is disclosed including a chassis having a face plate carrying control elements whose center-to-center distance and vertical positions relative to the face plate are adjustable. The chassis is enclosed within an exterior case adjustably secured to the chassis so as to accommodate various instrument panel thickness configurations and govern the extent of projection of the control element shafts from the instrument panel.

8 Claims, 5 Drawing Figures

REPLACEMENT RADIO RECEIVER APPARATUS FOR AUTOMOTIVE INSTALLATIONS INCLUDING ADJUSTABLY POSITIONABLE CONTROL ELEMENTS AND CHASSIS CASE

FIELD OF THE INVENTION

This invention relates generally to automobile radio receiver apparatus and particularly to replacement radio receiver apparatus having adjustably mounted control elements and exterior case means so as to be capable of accommodation by a wide range of automotive instrument panel configurations.

BACKGROUND OF THE INVENTION

Original equipment automobile radio receiver apparatus typically comprises a pushbutton AM receiver and the replacement thereof with a better quality radio receiver having higher fidelity and a greater variety of programming or reception including, for example, FM and FM stereo, is often desired. However, there are a number of obstacles, sometimes deliberately introduced, to the installation of "aftermarket" receivers, that is, those of non-original equipment manufacturer origin. For example, while most imported cars utilize a standard control shaft center-to-center spacing of 130mm in the instrument panels thereof, domestic vehicles generally have greater and often specialized spacings.

The positions of the control shaft apertures relative to the tuning dial/pushbutton cutout in the instrument panel moreover typically vary between automobile makes and even between models of the same make. Furthermore, the space behind the instrument panel is often particularly constricted so that the attempted replacement of the original equipment manufacturer's receiver is thwarted because of interference with braces, conduits and/or other structural members.

Superimposed on these conditions are the varying effective thickness configurations of automobile instrument panels. Most imported car panels are the simplest in that they are generally formed from a relatively flat, single sheet of steel. However, in some foreign and many domestic models, various other constructions are utilized. For example, there may be a special margin around the tuning dial/pushbutton cutout for receiving the nose piece of the radio receiver or a doubler for strengthening the instrument panel. In other vehicles, the portions of the instrument panel about the control element apertures are recessed to form wells so that the panel surfaces engaged by the control elements are in a plane different from that including the tuning dial/pushbutton cutout.

All of the foregoing complications can be, and often are, avoided by mounting the replacement radio receiver under the dash and concealing the instrument panel cutout and control shaft apertures under a decorative cover plate. However, such mounting is considerably less desirable than in-dash installation because of increased susceptibility to theft and possible interference with the legs of the driver or front seat passenger.

SUMMARY OF THE INVENTION

In the radio receiver apparatus of the present invention, all of the foregoing factors are taken into consideration and the invention comprehends an in-dash replacement receiver that not only fits virtually all imported and domestic automobiles but provides an installation having an original equipment appearance.

In accordance with one, specific, exemplary form of the invention there is provided replacement radio receiving apparatus adapted to be mounted in an automobile instrument panel having a preexisting tuning means cutout and control element apertures. The apparatus includes a chassis having a front portion with forwardly projecting pushbutton station selectors, tuning indicator means and control elements. A face plate attached to the front portion of the chassis, has a central opening through which the pushbuttons and tuning indicator project along with L-shaped control element openings adjacent the central opening. The control elements are thereby adjustably positionable relative to the face plate along the horizontal and vertical legs of the control element openings. The control elements, pushbuttons and tuning indicator means may thereby be aligned with the existing cutout and apertures in the instrument panel.

An exterior case encloses the chassis and is adjustably secured thereto to slide in and out to accommodate various instrument panel thickness configurations and determine the extent of projection of the control element shafts.

BRIEF DESCRIPTION OF THE DRAWINGS

A better understanding of the invention may be had by reference to the detailed description below taken in conjunction with the accompanying drawings, in which.

DETAILED DESCRIPTION OF THE INVENTION

Figure 1:
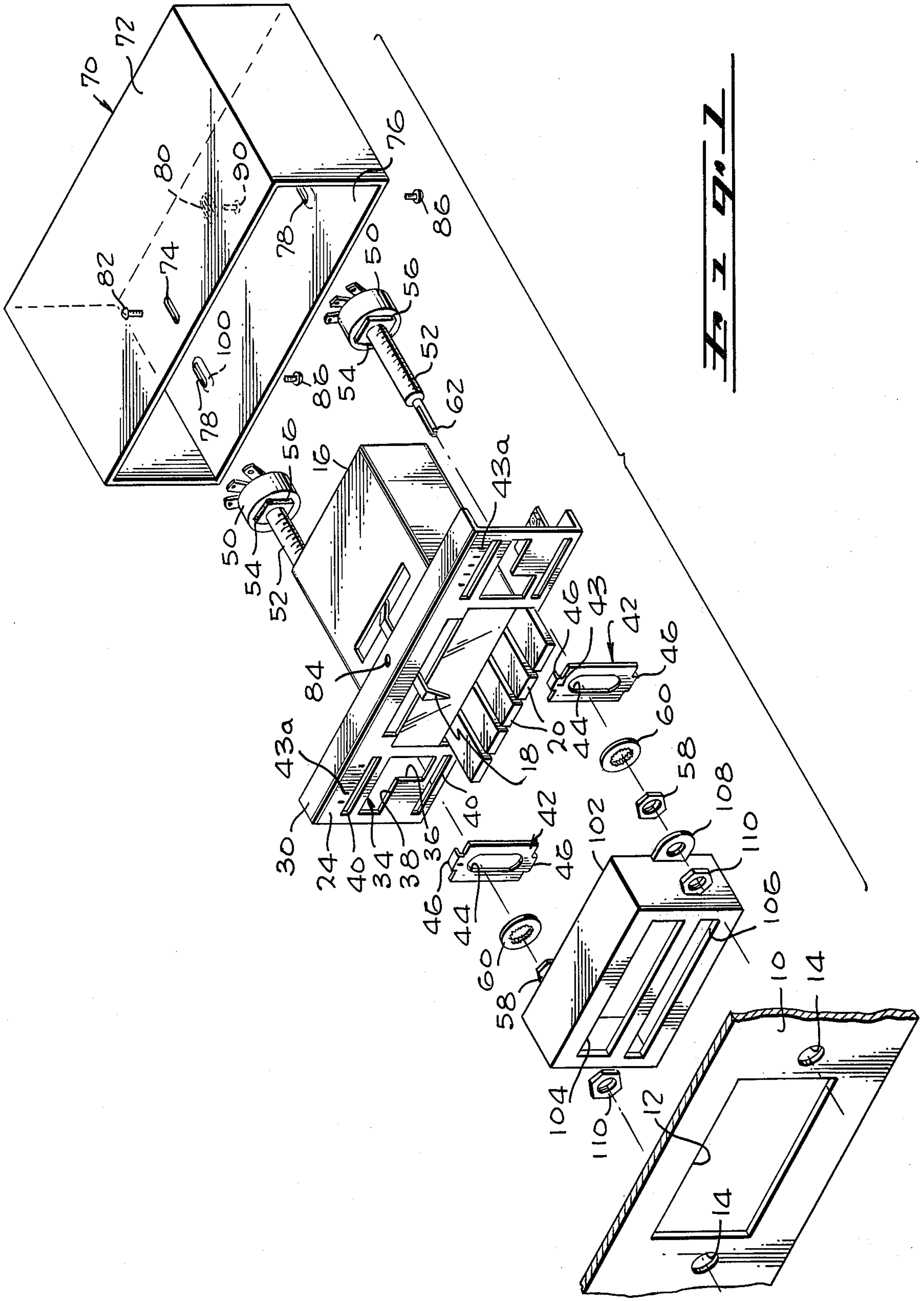
FIG. 1 is an exploded, perspective view of a replacement radio receiver apparatus according to the present invention.
Figure 2:
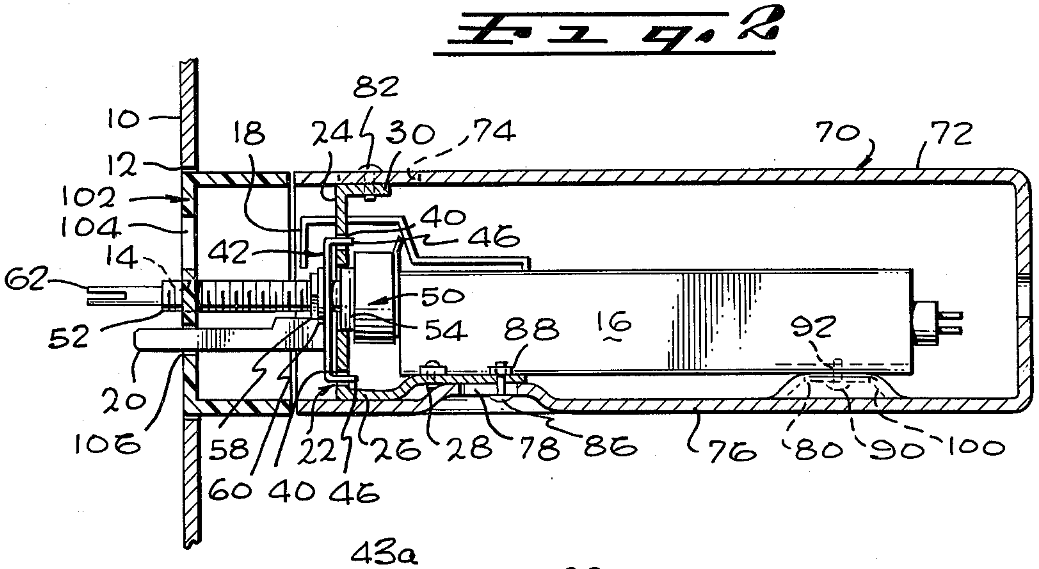
FIG. 2 is a longitudinal cross-sectional view of the receiver apparatus of FIG. 1.

Turning now to the drawings, the replacement radio receiver apparatus of the invention is designed for mounting in an instrument panel 10 having a tuning dial/pushbutton cutout 12 and a control element aperture 14 on each side of the cutout. Typically, as is well known, an instrument panel of the kind found in automobiles extends generally laterally and vertically as viewed by the frontseat passengers.

The radio apparatus of the invention includes a frame or chassis 16 carrying appropriate radio receiver components. It will become evident that the invention described and claimed herein is not limited to any particular type of radio receiver but such receiver will typically provide AM/FM-FM stereo reception and may be in the form of a combination unit housing tape playback means as well.

Among the components carried by the chassis 16 are a tuning dial pointer 18 and a tuning device including, by way of example, five pushbutton station selectors 20 projecting from the forward margin of the chassis 16. By way of definition, "forward" pertains to portions of the radio receiver closest to the instrument panel and "rearward" applies to those portions of the apparatus furtherest away from said panel. The term "longitudinal" will be used to refer to a direction extending generally normal to the instrument panel and would apply by way of illustration to the direction of movement of the station selector pushbuttons 20.

Attached along the forward margin of the chassis is a face plate 22 including a vertical or upright section 24 and a lower, rearwardly extending flange 26. The flange 26 is attached to the lower surface of the chassis by suitable fasteners such as machine screws 28. The face plate 22 also has an upper margin 30 extending rearwardly from the upright section 24.

The tuning dial pointer 18 and the pushbuttons 20 extend through a central, rectangular opening 32 in the upright section 24 of the face plate 22.

The face plate 22 further includes on each side of the central opening 32 an L-shaped opening 34 defined by intersecting vertical and horizontal slots 36 and 38, respectively. Above and below the opening 34 are horizontally extending, parallel guide slits 40.

A generally rectangular guide plate 42, having a vertical slot 44, is disposed over a portion of each opening 34 against the front surface of the face plate 22 and in horizontally sliding relation therewith. Rearwardly projecting tabs 46 along the upper and lower edges of each guide plate 42 extend into the upper and lower slits 40. It will be evident that in the apparatus described to this point, the guide plates 42 may be moved laterally between inner and outer limiting positions relative to the central opening 32, said movement being guided and limited by the slits 40. To facilitate installation of the replacement radio receiver, an indicator mark 43 may be impressed in each guide plate 42 near the upper edge thereof. The indicator marks 43 may be aligned with any of a series of like marks 43*a* applied to the face plate 22 above and along each of the upper slits 40. Corresponding marks 43*a* on opposite sides of the central opening 32 are spaced to conform with the spacing between control element apertures in the instrument panels of major automobile manufacturers.

The radio receiving apparatus further includes a pair of control elements 50 each having an elongated, threaded mounting sleeve 52 received by the opening 34 and slot 44 in the face plate 22 and guide plate 42, respectively. The control elements 50 comprise well known devices used to control various functions typically including volume, station selection, tone, balance and power. Each control element 50 further includes a square boss 54 having flats 56 for engaging the edges of the opening 34 to prevent rotation of the control element during tightening of a nut 58 received, along with a lock washer 60, by the threaded sleeve 52. Further, in each case a knob shaft 62 projects from the sleeve 52.

The guide plates 42, besides functioning as guides to facilitate the lateral placement and separation of the control elements 50, serve as washers to provide increased surface area against which the nuts 58 and washers 60 bear.

The radio receiving apparatus also includes a generally rectangular exterior case 70, typically formed of sheet metal, for enclosing the chassis 16. The case 70 includes an upper wall 72 having a centrally positioned, longitudinally extending slot 74 adjacent the front margin thereof. The case 70 also has a bottom wall 76 with a pair of longitudinally extending slots 78 adjacent the side walls and somewhat rearward of the slot 74, and a centrally located longitudinal slot 80 toward the rear of the case 70. A machine screw 82 extends through the upper slot 74 and is retained by a threaded hole 84 in the upper margin 30 of the face plate 22. Machine screws 86 extend through the slots 78 and are received by the outer extremities of the flange 26, nuts 88 being welded thereto. Lastly, a machine screw 90 passes through the rear slot 80 and is received by a threaded hole 92 in the lower surface of the chassis.

The exterior case mounting slots 74, 78 and 80 are preferably located in wells 100 formed in the sheet metal of the case 70 so that the machine screw heads are recessed.

A nose piece 102, typically a molded plastic part, fits over the tuning dial and has elongated dial face and pushbutton openings 104 and 106, respectively. Apertured mounting ears 108 project from the sides of the nose piece 102 and are received by the threaded sleeves 52 of the control elements 50 and held in place by nuts 110. The nose piece 102 is designed to fill the space around the pushbuttons 20. The outer surface of the nose piece 102 is shaped and dimensioned for a snug fit relative to the cutout 12. The front surface thereof has a finished appearance and is preferably flush with the instrument panel so as to blend in with the design of the interior of the vehicle. The nose piece 102, depending upon the installation, can be used along or in conjunction with a cover panel (not shown) on the front of the instrument panel.

Figure 3A:
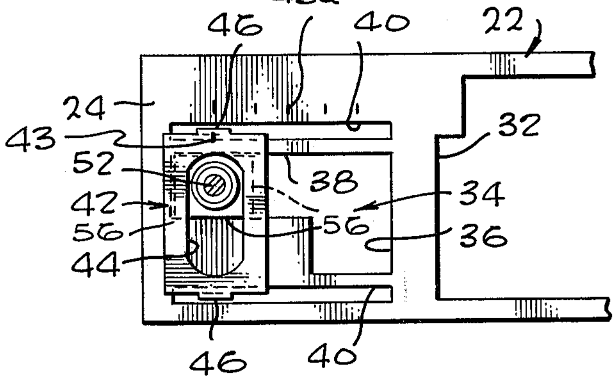
FIGS. 3A, 3B and 3C are front views of a portion of the receiver apparatus of the invention showing, by way of example, three positions of one of the control elements relative to the tuning dial/pushbutton cutout.
Figure 3B:
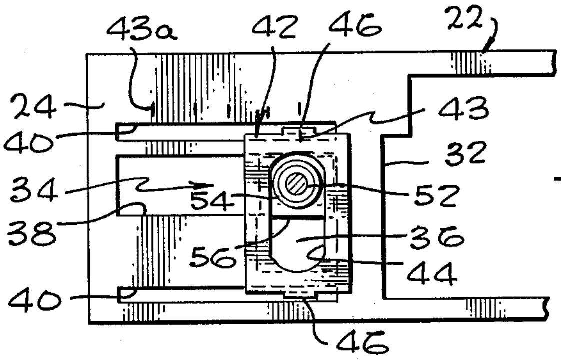
Figure 3C:
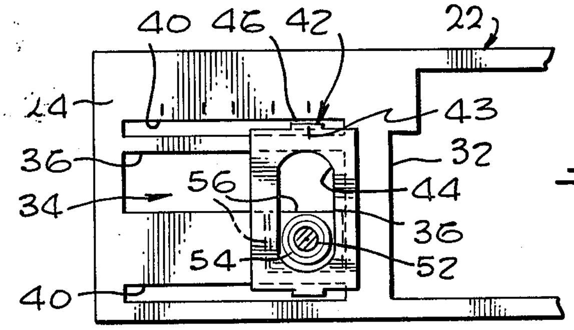

In accordance with the invention, upon installation of the replacement radio receiving apparatus, the control elements 50, as best shown in FIGS. 3A, 3B and 3C, may be moved relative to the face plate 22 to align them with the existing control element apertures 14 in the instrument panel 10. In the outermost position of the control elements 50, as shown in FIG. 3A, the center-to-center distance between the control elements is about 6-9/32 inches. In the innermost position of the control elements 50, as shown in FIGS. 3B and 3C, the center-to-center spacing is about 4⅞ inches. At the innermost positions of the control elements 50, they may also be moved vertically as necessary for alignment of the central opening 32 of the face plate 22 and the instrument panel cutout 12. When the required control element positions have been obtained, the nuts 58 are then tightened.

The amount of projection of the control element knob shafts 62 from the instrument panel may be controlled by loosening the machine screws 82, 86 and 90 and sliding the exterior case 70 in or out as required and then tightening said machine screws. By way of example, in a vehicle as described above in which the control element instrument panel apertures are recessed, the exterior case will be moved forwardly relative to the chassis so that both the nuts 110 and the front edge of the exterior case 70 are in engagement with the rear surface of the instrument panel.

What is claimed is:

1. Replacement radio receiving apparatus adapted to be mounted in an instrument panel having an existing cutout for tuning means and tuning indicator means and existing apertures laterally adjacent said cutout for receiving control element means, comprising:

a chassis carrying radio receiving means including tuning means and control element means projecting from a forward portion of said chassis and further including tuning indicator means disposed along said forward portion;

a face plate attached to said forward portion of said chassis and having a central opening through which said tuning means projects, said face plate including, laterally adjacent said central opening and on each side thereof, a control element means opening comprising intersecting vertical and horizontal slots, a control element means being mounted in each said control element opening, said control element means being adjustably positionable in said opening along said vertical and horizontal slots whereby said tuning means and said control elements may be aligned with said existing cutout and apertures in said instrument panel, said face plate further including a pair of parallel, horizontal guide slits associated with each control element means opening, each of said slits extending the full horizontal length of said opening one of said slits being positioned above said opening and the other being positioned below said opening;

guide plate means at least partially overlying each said control element means opening, each said guide plate means having a vertical slot through which said control element means extends and upper and lower tabs projecting into said horizontal guide slits, the position of said guide plate means being laterally adjustable relative to said face plate to any position along the length of said guide slits; and an exterior case enclosing said chassis

2. Replacement radio receiving apparatus, as defined in claim 1, in which:

said exterior case is adjustably secured to said chassis to permit longitudinal adjustment of the position of said case relative to said chassis.

3. Replacement radio receiving apparatus, as defined in claim 1, in which:

each said control element means includes a boss received by said control element means opening, said boss having flat surfaces adapted to engage the edges of said opening to prevent rotation of said control element means during adjustment and installation.

4. Replacement radio receiving apparatus, as defined in claim 1, in which:

said guide plate means has indicia cooperating with indicia on said face plate to facilitate positioning of said guide plate means for particular vehicular installations.

5. Replacement radio receiving apparatus, as defined in claim 1, including:

a nose piece disposed about said tuning means and tuning indicator means and having an outer margin shaped to conform closely to said existing instrument panel cutout.

6. Replacement radio receiving apparatus adapted to be mounted in an instrument panel having an existing cutout for tuning means and tuning indicator means and existing apertures laterally adjacent said cutout for receiving control element means, comprising:

a chassis carrying radio receiving means including station selector pushbuttons and control elements projecting from the forward margin of said chassis and further including a tuning indicator pointer disposed for movement along said forward margin;

a face plate attached to said forward margin of said chassis, said face plate having a vertically disposed section defining a central opening through which said pushbuttons project, said face plate further including L-shaped openings through which said control elements extend bilaterally of said central opening and horizontal slits above and below each of said L-shaped openings each of said slits extending the full horizontal length of said opening;

a guide plate at least partially overlying each said control element opening, said guide plate having a vertical slot through which said control element extends, said guide plate including upper and lower tabs extending into said horizontal slits in said face plate, said slits guiding and limiting the horizontal movement of said guide plate, said control elements being adjustably positionable in said face plate and guide plate openings whereby the pushbuttons and control elements may be aligned with said existing cutout and apertures in said instrument panel; and an exterior case enclosing said chassis, said case including longitudinal slots receiving fasteners securing said case to said chassis, the position of said exterior case relative to said chassis being longitudinally adjustable to accommodate the thickness configuration of said instrument panel.

7. A radio receiving apparatus, as defined in claim 6, in which:

said slots in said exterior case are formed in inwardly recessed wells of sufficiently depth to preclude any projection of said fastener means.

8. A radio receiving apparatus, as defined in claim 6, in which:

said guide plates and said face plate include alignable indicia to facilitate lateral adjustment of the positions of said control element for particular installations.

* * * * *